Nov. 7, 1939.   R. C. DEHMEL   2,178,954
METHOD AND APPARATUS FOR TESTING ELECTRICAL RESISTANCE
Filed Nov. 17, 1937

INVENTOR
R.C. DEHMEL
BY
*G. M. Campbell*
ATTORNEY

Patented Nov. 7, 1939

2,178,954

UNITED STATES PATENT OFFICE 2,178,954

METHOD AND APPARATUS FOR TESTING ELECTRICAL RESISTANCE

Richard C. Dehmel, Brooklyn, N. Y., assignor to Bell Telephone Laboratories, Incorporated, New York, N. Y., a corporation of New York Application November 17, 1937, Serial No. 174,990

7 Claims. (Cl. 175—183)

This invention relates to the measurement of resistances and more particularly to the measurement of resistances of very high value, for example, $10^{10}$ megohms.

The object is to provide means whereby research laboratories, commercial laboratories, manufacturers and others interested in the study or routine tests of insulating materials may obtain accurate and reliable resistance data with high precision. A further object is to provide a method of test involving very simple procedure which will yield results of very high precision.

The features of this invention provide means for the measurement of very high resistances in the form of a balanced Wheatstone bridge having in one arm thereof an electron discharge device. Calibrating means is provided for throwing the bridge out of balance by impressing on the control grid of the electron discharge device a known potential. In the actual measurement of the resistance a standard condenser connected to the said grid is charged by the leakage current through the resistance to be measured until the bridge duplicates the calibrated out-of-balance condition. The resistance is calculated from a measurement of the time required to charge the standard condenser and the known circuit constants.

During the past several years considerable attention has been devoted to the study of dielectrics by research organizations and manufacturers interested in the development of new insulating materials. This has necessitated the production of test equipment capable of adequately measuring these new materials which have very high resistivities.

The most common methods of test heretofore employed for high resistance measurements have been the direct galvanometer deflection method and the ballistic method whereby a standard, highly insulated condenser is charged in circuit with the unknown resistance for a fixed period of time and then discharged into a ballistic galvanometer. The latter method has been found to have some advantages over the former and this invention is based upon an improvement in its circuit and test procedure which has resulted in simplicity and accuracy of an order not heretofore attained.

The invention may be more easily understood by reference to the drawing in which.

Figure 1:
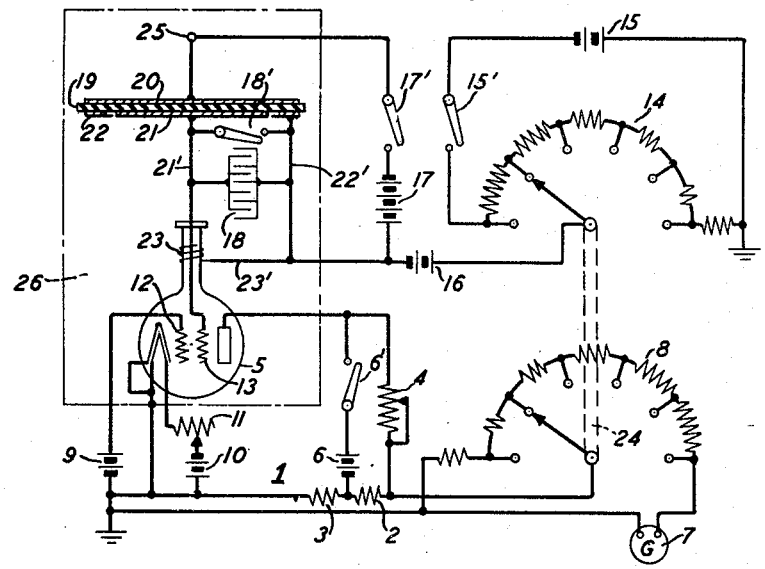
Fig. 1 is a schematic diagram of the electrical circuits employed.

Referring now to Fig. 1, reference numeral 1 denotes a Wheatstone bridge circuit in which resistors 2, 3, rheostat 4 and the anode-cathode resistance of vacuum tube 5 form its four arms. Battery 6 through associated switch 6' supplies the necessary current to operate the bridge. Galvanometer 7 with the usual universal shunt 8 is connected across conjugate points of the bridge in the usual manner. The switch blade of shunt 8 is designed to move simultaneously with the blade of calibrating potentiometer 14. This is accomplished by mounting the two blades on a common insulated shaft diagrammatically represented on Fig. 1 by insulated rod 24. Calibrating potentiometer 14, like shunt 8, is arranged as a decade box having definite resistance points as indicated and its potential is derived through switch 15' from battery 15. The fact that these two blades are made to move together in definite relationship serves to simplify the calculations involved, as will be more fully explained later. The vacuum tube cathode is heated in the usual way by means of battery 10 through rheostat 11. Grid 12 is given an appropriate bias potential by battery 9. The test circuit of which test specimen 19 forms a part, acts upon control grid 13 so as to disturb the balance of bridge 1.

Battery 16 furnishes the normal bias for control grid 13, and battery 17 furnishes the test current flowing through specimen 19. Electrodes 20 and 21 and guard ring 22 are held closely against opposite faces of the specimen according to the usual practice. Condenser 18 is of large capacity compared with the capacity of test specimen 19 and has a switch 18' adapted to shunt it during calibration. Control grid guard 23 shunts surface leakage currents from the bridge circuit and from the bias batteries over wire 23'.

Figure 2:
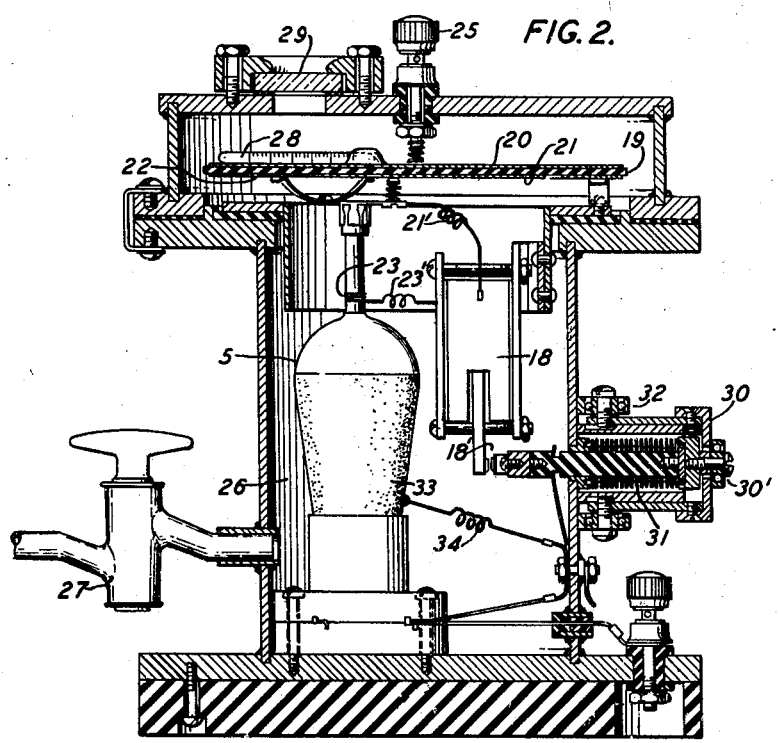
Fig. 2 shows one form of apparatus for testing a sample in an evacuated space when high precision is required.

Fig. 2 more clearly discloses one form of specimen enclosure necessary for high precision work and contains the apparatus within the dotted enclosure shown on schematic Fig. 1. In this figure corresponding parts bear the same reference numeral as in Fig. 1. It will be noted that chamber 26 may be evacuated through pet-cock 27, thereby greatly improving the condition of test by reducing the conduction through the gas surrounding the specimen which at such high specimen resistivities approaches sufficiently near the resistivity of the specimen as to introduce excessive error in the result obtained. Specimen enclosure 26, in addition to permitting evacuation, also serves to exclude light and stray magnetic and electrostatic fields which in conjunction with the circuit in and about vacuum tube 5 would introduce considerable error in a well-known way. In order to most effectually shield against stray magnetic fields the walls to chamber 26 are preferably made of magnetic iron. A thermometer 28 is shown on top of electrode 20 to give the test temperature which may be read through sealed aperture 29. Condenser switch 18' is operated from outside chamber 26 by means of knob 30. The entrance of the control rod of switch 18' is sealed against atmospheric pressure by bellows 31. When knob 30 is rotated, bearings 32 are cammed outwardly by the curved, cylindrical outer face of chamber 26. The control rod of switch 18' is thereby drawn outwardly through ball bearing 30', causing switch 18' to open. It is recognized that other forms of chambers may be employed instead of chamber 26 and the type chamber employed would depend upon the materials to be measured and the conditions under which the test is to be performed; but for the precision measurement of insulator specimens of very high resistivities it has been found mandatory that some means be employed to remove the specimen from the atmosphere of ionizable gases. In order to more completely protect against stray currents which flow through the glass envelope of vacuum tube 5 as well as along its surface, a conducting material 33 is applied to the lower end of the outer surface of the glass envelope, which conducting material is grounded by means of conductor 34.

While the drawing does not show specific means for controlling humidity, it is perfectly obvious that a desiccant may be placed within the chamber 26 to dry the atmosphere should it be desirable not to evacuate entirely. Also, inert gases such as nitrogen may be admitted through pet-cock 27 and kept dried by a desiccant if desired. The temperature may be controlled by installing within the chamber an electric heater, or a heating or cooling means of obvious form may be applied to the outer wall of chamber 26 before or during evacuating, the specimen temperature being obtained from thermometer 28. Thus it is seen that the structure disclosed admits of numerous inherent methods of specimen conditioning and isolation from anomalous disturbing influences which affect the accuracy of the measurements, all of which are plainly within the scope of the invention.

The general equation for the transient circuit conditions wherein bridge 1 is first balanced and then thrown out of balance until a known change in control grid bias has been attained by the charging of ballistic condenser 18 through the resistance of specimen 19 can be shown to be:

$$R = \frac{Et}{e(c+C)} \quad (1)$$

where:

R = specimen resistance
E = E. M. F. of test battery 17
t = charging time of condenser 18
e = potential of condenser 18 at time $t$
c = capacity of specimen between electrodes
C = capacity of ballistic condenser 18.

Since, as previously stated, the capacity $c$ of the specimen and electrodes is very small as compared with capacity C of condenser 18, Equation 1 may be written:

$$R = \frac{Et}{eC} \quad (2)$$

Because the potentiometer 14 and shunt 8 are mechanically linked so that they move together and their resistance steps are arranged in decade form, it will be observed that a definite relationship exists between the calibrating potential V and the shunt factor $f$. This may be expressed mathematically by the equation:

$$V = 10^{-5} E_c f \quad (3)$$

where:

V = calibrating potential derived from potentiometer 14
$E_c$ = voltage of battery 15
$f$ = shunt factor of shunt 8.

In using this device, bridge 1 is first balanced by means of rheostat 4 while switches 6', 17' and 18' are closed and switch 15' is open. Switch arm 24 is then moved to vary potentiometer 14 and shunt 8 until the charging time for condenser 18 will be easily observable for the specimen resistance to be measured. By closing switch 15' a deflection of galvanometer 7 will be noted because bridge 1 is thereby thrown off balance by the change of potential of control grid 13 derived from potentiometer 14. This deflection is the calibrating deflection and the deflection obtained while testing the specimen is to be made equal to it. That is to say, the deflections are made the same so that the voltage $e$ of condenser 18 at time $t$ is exactly equal to the change of grid potential V obtained during calibration. This, obviously, reduces the errors due to non-linearity of the galvanometer or vacuum tube circuit because the entire test circuit conditions are made the same as those existing during calibration. Since the change in grid potential is the potential V derived from calibrating potentiometer 14, and also since the test condenser voltage $e$ is made its equal, the value of V in Equation 3 may be substituted for $e$ in Equation 2 to get:

$$R = \left[\frac{E}{10^{-5} E_c C}\right] \frac{t}{f} = \frac{Kt}{f} \quad (4)$$

where $$K = \left[\frac{E}{10^{-5} E_c C}\right], \text{ a constant}$$

Equation 4 shows the simplicity of the calculations involved in obtaining the specimen resistance by using the apparatus and method of this invention.

To test a specimen of insulating material it is positioned between electrodes 20, 21 and guard ring 22. This assembly is then placed within a suitable chamber such as vacuum chamber 26, where it is brought to the required test conditions as to temperature, air pressure, dryness, etc. The bridge is balanced and the calibrating deflection obtained according to the method above described.

It should be noted that during the calibrating period the test specimen has been electrostatically charged and all anomalous currents have subsided, leaving only the steady state leakage current, which current is employed to charge condenser 18. Switch 18' is then opened to permit condenser 18 to charge through the specimen. Timing is begun simultaneously with the opening of switch 18' and is continued until the condenser voltage $e$ is equal to the calibrating potential V, as indicated by the galvanometer reading. From the time observed and the shunt factor used, the specimen resistance is calculated according to Equation 4.

While no particular time measuring device has been shown, it is obvious that timing may be accomplished in various ways. For example, a stop watch may be manually started and stopped or an electric chronometer may be started when switch 18' is opened and stopped automatically when condenser 18 has been charged to a voltage equal to the calibrating voltage. Automatic stopping may be achieved by employing adjustable contacts on the galvanometer pointer or using a photoelectric circuit associated with the pointer in a well-known manner.

What is claimed is:

1. A method of measuring resistance values comprising first balancing a bridge circuit having in one arm thereof an electron discharge device containing a grid, throwing said bridge out of balance by impressing on said grid a known potential, restoring the balance of said bridge by removing said known grid potential, charging a condenser in the circuit of said grid by means of a current flowing through the resistance to be measured until the grid potential is again equal to said known grid potential and measuring the time required to attain said known grid potential.

2. A method of measuring resistance values comprising first balancing a bridge circuit having known circuit constants and having in one arm thereof an electron discharge device containing a grid, throwing said bridge out of balance by impressing on said grid a known potential, restoring the balance of said bridge by removing said known grid potential, charging a condenser in the circuit of said grid by means of a current flowing through the resistance to be measured until the grid potential is again equal to said known grid potential, measuring the time required to attain said known grid potential and calculating the resistance of said known circuit constant and measured time.

3. A device for measuring resistances comprising in combination a bridge circuit having an electron discharge device connected in one arm thereof, a control grid in said discharge device, a condenser connected in circuit with said control grid, an unknown resistance to be measured in circuit with said condenser and grid, and means associated with said condenser and control grid for varying their potentials during a measured period of time to a predetermined value by a passage of current through said unknown resistance.

4. A device for measuring resistances comprising in combination a bridge circuit having an electron discharge device connected in one arm thereof, a control grid in said discharge device, a condenser connected in circuit with said control grid, an unknown resistance in circuit with said condenser and grid, means associated with said control grid adapted to adjust its potential to throw the bridge out of balance by a measurable amount, and another means associated with said condenser and control grid also adapted to throw the bridge off balance by an amount equal to said measurable amount by the passage of current through said unknown resistance.

5. In a device for measuring resistances, a bridge circuit having a calibrating means associated therewith comprising a potentiometer arranged in decade steps so that the potential at each successive step is ten times that of its predecessor, a voltage indicating means connected to diagonals of said bridge adapted to measure out of balance voltage, a shunt for said voltage indicating means arranged in decade steps to attain its voltage response in successive ratios of ten to one, and mechanical means adapted to cause said potentiometer and said shunt to move simultaneously in predetermined sequence.

6. In a device for measuring resistances, a bridge circuit having in one arm thereof an electron discharge device, capacity means associated with said electron discharge device adapted to store a leakage current flowing through a resistance specimen to be measured, supporting means for said specimen, and means for isolating said electron discharge device, said capacity means and said supporting means from the disturbing influence of stray radiant energy and conducting gases.

7. In a device for measuring resistances, a bridge circuit having in one arm thereof an electron discharge device, capacity means associated with said electron discharge device adapted to store a leakage current flowing through a resistance specimen to be measured, supporting means for said specimen, and means for isolating said electron discharge device, said capacity means and said supporting means from the disturbing influence of stray radiant energy and conducting gases, said isolating means being further adapted to bring said specimen to predetermined test conditions.

RICHARD C. DEHMEL.